J. S. PFRIMMER.
Wagon Brake.

No. 82,439. Patented Sept. 22, 1868.

UNITED STATES PATENT OFFICE.

JACOB S. PFRIMMER, OF LANESVILLE, INDIANA.

IMPROVEMENT IN WAGON-BRAKES.

Specification forming part of Letters Patent No. 82,439, dated September 22, 1868.

*To all whom it may concern:*

Be it known that I, JACOB S. PFRIMMER, of Lanesville, in the county of Harrison, and State of Indiana, have invented a certain new and useful Improvement in Brakes for Vehicles; and do hereby declare that the following is a full, clear, and exact description thereof, reference being had to the accompanying drawings, and to the letters of reference marked thereon.

The nature of my invention consists in the construction and arrangement of a self-acting and self-regulating brake for vehicles, which is adapted to general use, and which will be entirely out of the way when loading or unloading.

In order to enable others skilled in the art to make and use my invention, I will now proceed to describe its construction and operation, referring to the annexed drawings, which form a part of this specification, and in which—

Figure 1:
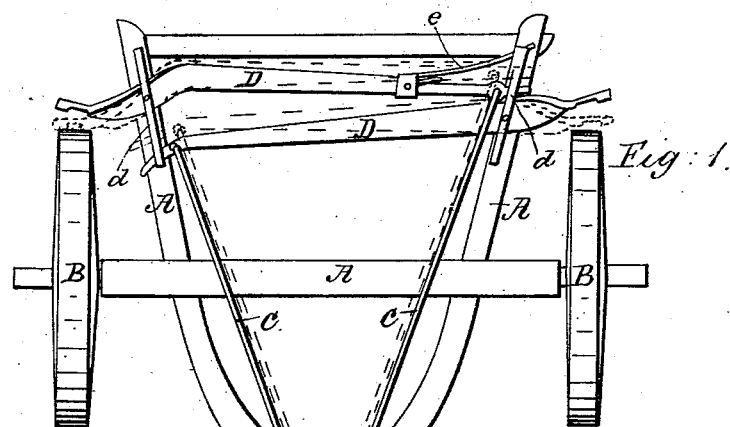
Figure 2:
Figure 2:
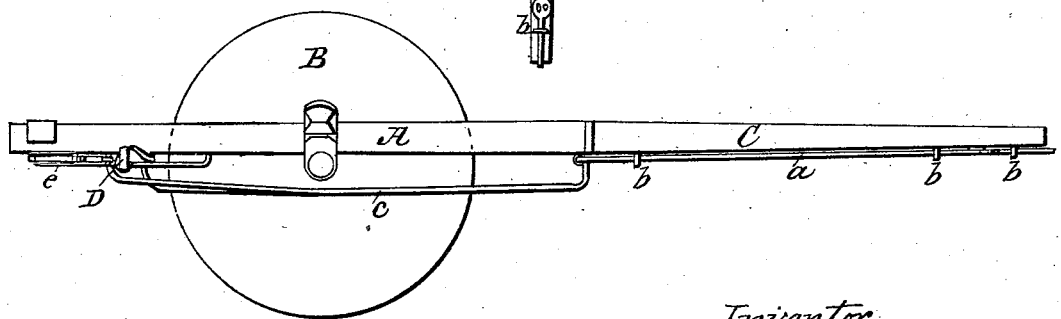

Figure 1 is a plan view, and Fig 2 is a side view.

A represents the bed of the wagon, made in any of the usual ways, with its wheels B B and tongue C. Under the tongue C is a rod, $a$, which slides in rings $b\ b$, and is provided in its forward end with a suitable device for attaching the tongue-chains. The rear end of said rod is forked, and connecting-rods $c\ c$ are attached to the prongs of said fork.

On each side, underneath the frame A, and in rear of the wheels, are angular bars $d\ d$, between which and said frame the levers D D are pivoted, in such a manner that one end of each lever extends outside of the bed in rear of the wheel, which end is formed in the usual mode for a brake, and the other end of said lever extends across underneath the bed, and into the angular bar on the other side. At this end the connecting-rods $c\ c$ are attached to the levers. The two levers are placed one in rear of the other, so arranged that they will be applied to the wheels at the same time.

The tongue-chains being attached to the rod $a$, whenever the wagon is thrown forward by a descending grade, and the horses holding back, brings the brake in contact with the wheels, and, as soon as the level grade is reached, the spring $e$, fastened to the rear lever D, throws the arm forward, thus relieving the wheels as soon as the horses stop backing on the tongue-chains.

I am aware that the several parts of the above-described invention, taken separately, are, of themselves, not new.

What I claim is—

The arrangement upon the front section of a vehicle of the forked rod $a$, oblique rods $c\ c$, levers D D, keepers $d\ d$, and spring $e$, all constructed and operating as set forth.

In testimony that I claim the foregoing I have hereunto set my hand this 30th day of May, 1868.

JACOB S. PFRIMMER.

Witnesses:
 JACOB BRUCE,
 HENRY ZENAS.